United States Patent [19]

Ito

[11] Patent Number: 5,543,881
[45] Date of Patent: Aug. 6, 1996

[54] LENS BARRIER MECHANISM OF OPTICAL APPARATUS

[75] Inventor: Kenji Ito, Kanagawa-Ken, Japan

[73] Assignee: Canon Kabushiki Kaisha, Tokyo, Japan

[21] Appl. No.: 255,042

[22] Filed: Jun. 7, 1994

[30] Foreign Application Priority Data

Jun. 18, 1993 [JP] Japan .................................. 05-147462

[51] Int. Cl.⁶ .................................................. G03B 9/26
[52] U.S. Cl. ............................................................ 354/253
[58] Field of Search ..................................... 354/202, 253, 354/288

[56] References Cited

U.S. PATENT DOCUMENTS 5,159,372  10/1992  Nomura et al. ......................... 354/253

Primary Examiner—David M. Gray
Attorney, Agent, or Firm—Robin, Blecker, Daley & Driscoll

[57] ABSTRACT

An optical apparatus having a lens barrier mechanism includes a first barrier member which is rotatable and a second barrier member which is movable up and down. The lens barrier mechanism changes the state of an aperture from a covered state over to an open state and vice versa by causing the first barrier member to rotate and the second barrier member to move upward and downward.

21 Claims, 2 Drawing Sheets

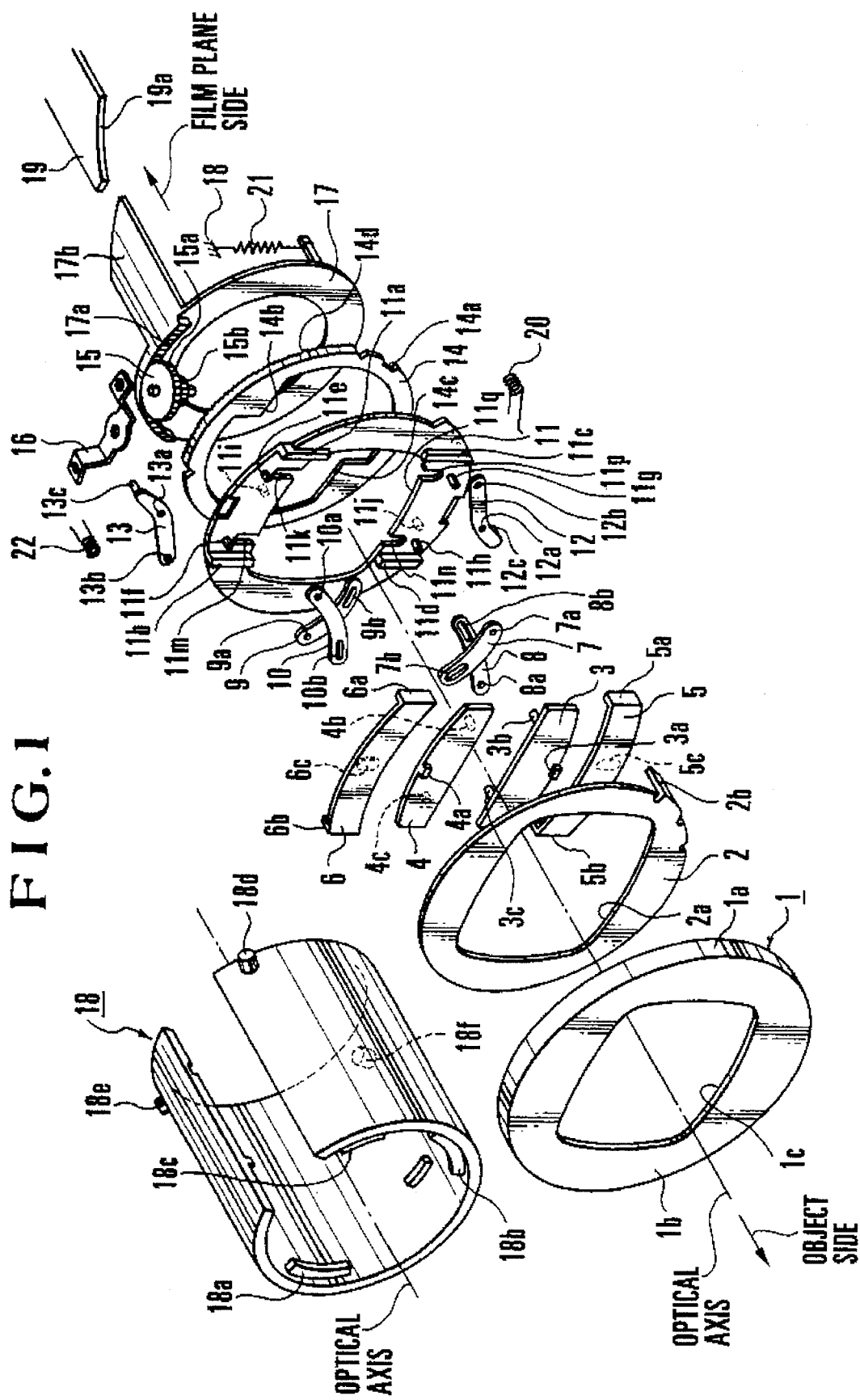

5,543,881

LENS BARRIER MECHANISM OF OPTICAL APPARATUS

BACKGROUND OF THE INVENTION

1. Field of the Invention

This invention relates to a lens barrier mechanism for an optical apparatus such as a camera, a lens barrel or the like.

2. Description of the Related Art

Many of the cameras manufactured these days to use noninterchangeable lenses (compact cameras) are of the so-called retractable mount type arranged to have the lens barrel stowed within the camera body when the lens barrel is not used for shooting. Each of the retractable mount type cameras is provided with a lens-barrel-interlocking type barrier mechanism which opens and closes in association with the drawing-out and drawing-in actions of the lens barrel. The lens barrier mechanisms provided in the retractable mount type camera are of many different kinds. Each of the known lens barrier mechanisms has been arranged such that its aperture is small relative to the diameter of the lens barrel when the barrier mechanism is fully open. Therefore, a space required for barrier blades of the barrier mechanism to retreat from an optical path in fully opening the barrier mechanism can be secured within the lens barrel without difficulty. Besides, it has been also possible to arrange the lens barrier mechanism to have a relatively simple structural arrangement.

Meanwhile, it has recently become popular to provide a camera with a panorama shooting mechanism which is arranged to show a shooting image plane in such a form that appears to be horizontally longer than a standard image plane and is called a panorama image plane. According to the known panorama shooting mechanism, however, the panorama image plane is obtained by merely reducing the vertical dimension of the standard image plane. It is thus hardly possible to attain a true panorama shot effect with the known panorama shooting mechanism. In view of this problem, there has been proposed a camera which is capable of giving a true panorama shooting effect by making the horizontal dimension of the shooting image plane truly larger than the standard image plane.

However, according to the proposed camera as mentioned above, it becomes difficult to secure a retreat space which is required for the barrier blades to retreat sideward from the front side of the lens when the barrier mechanism is fully opened, because the aperture of the barrier mechanism of such a camera is arranged to be horizontally larger than that of the conventional camera when the barrier mechanism is fully open. Therefore, the lens barrier mechanism of the camera of the proposed kind cannot be configured in a manner similar to the conventional lens barrier mechanism. The camera proposed thus has presented a problem.

SUMMARY OF THE INVENTION

One aspect of this invention lies in the provision of an optical apparatus having a lens barrier mechanism including a first barrier member arranged to linearly move and a second barrier member arranged to rotate.

The above and other aspects and features of this invention will become apparent from the following detailed description of an embodiment thereof taken in conjunction with the accompanying drawings.

BRIEF DESCRIPTION OF THE DRAWINGS

FIG. 1 is an exploded oblique view showing the essential parts of a camera having a lens barrel mechanism which is arranged according to this invention.

FIG. 2($a$) shows the lens barrel in a state of having a lens barrier fully open. FIG. 2($b$) shows the lens barrel in a state of having the lens barrier completely closed. FIG. 2($c$) shows a barrier cover.

DETAILED DESCRIPTION OF THE PREFERRED EMBODIMENT

Figure 2A:
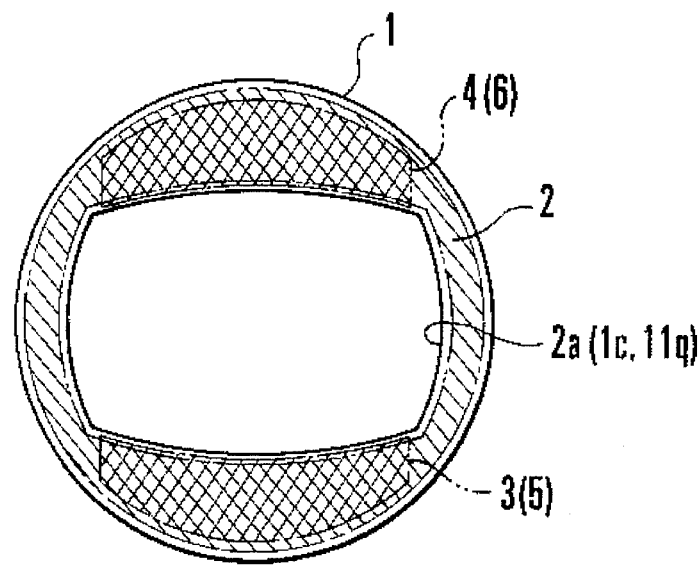
FIGS. 2($a$), 2($b$) and 2($c$) are front views of the lens barrel of the camera having the lens barrier mechanism which is arranged as shown in FIG. 1.

An embodiment of this invention is described below with reference to the accompanying drawings.

FIG. 1 is an exploded oblique view showing the lens barrier mechanism part of a lens barrel of a camera having a lens barrier mechanism arranged according to this invention. Referring to FIG. 1, a barrier cover 1 has a horizontally oblong aperture 1$c$ which is of the same shape as the full open barrier aperture of a lens barrier. The size of the horizontally oblong aperture 1$c$ of the barrier cover 1 is similar to the outside diameter $\phi$D1 of a lens barrel member 18 as shown in FIG. 2($c$). The barrier cover 1 is fitted on the front end part of the lens barrel member 18 at its tubular part 1$a$. The outside diameter of the lens barrel is defined by this tublar part 1$a$. The lens barrel member 18 is provided with three projections 18$a$, 18$b$ and 18$c$ on its inner circumferential face in the neighborhood of its front end part. A rotary barrier plate 2 which serves as a first barrier is placed in a space between a disk part 1$b$ of the barrier cover 1 and the projections 18$a$, 18$b$ and 18$c$. The rotary barrier plate 2 is rotatable on an optical axis in this space and within the lens barrel member 18, and is supported by the inner side of the lens barrel member 18 in such a way as to rotate while sliding over the faces of the projections 18$a$, 18$b$ and 18$c$. Three pins 18$d$, 18$e$ and 18$f$ are provided on the outer circumferential surface of the lens barrel member 18 and are slidably inserted into cam slots of a known cam tube (not shown) which is fitted on the lens barrel member 18.

The rotary barrier plate 2 is provided with a horizontally oblong aperture 2$a$ which becomes a barrier aperture when the lens barrier is fully open. The rotary barrier plate 2 is further provided with an arm 2$b$ which protrudes rearward (toward a film plane in parallel to the optical axis) from a peripheral edge part of the rotary barrier plate 2. The arm 2$b$ engages a cutout groove 14$a$ provided in the peripheral part of a cam ring 14.

A pair of barrier blades 3 and 4 and another pair of barrier blades 5 and 6 which serve as second and third barriers are disposed rearwardly of the rotary barrier plate 2. The barrier blades 3 and 4 are arranged to be vertically movable by levers 7 to 10 disposed rearwardly of these blades. The levers 7 to 10 are pivotally attached to the front side of a barrier base plate 11 which is disposed rearwardly of the levers 7 to 10. The levers 7 and 8 are arranged to constitute a parallel link mechanism in conjunction with the barrier blade 3. The levers 9 and 10 are arranged to constitute a parallel link mechanism in conjunction with the barrier blade 4.

The barrier blades 5 and 6 are disposed a little forwardly of the barrier blades 3 and 4 in the direction of the optical axis. Protruding parts 5$a$ and 5$b$ are formed on the right and left ends of the barrier blade 5. The right and left side faces of the barrier blade 3 are arranged to be movable up and down relative to the barrier blade 5 by sliding over the inner side faces of the protruding parts 5a and 5b of the barrier blade 5.

The barrier blade 6 which is disposed a little forwardly of the barrier blade 4 in the direction of the optical axis is provided with protruding parts 6a and 6b. The protruding parts 6a and 6b are arranged on the right and left ends of the barrier blade 6 to vertically guide the barrier blade 4 while slidably contacting with the right and left side faces of the barrier blade 4 when the barrier blade 4 ascends or descends. The barrier blade 4 is thus arranged to vertically move relative to the barrier blade 6 while slidably contacting with the inner sides of the protruding parts 6a and 6b of the barrier blade 6.

A vertical groove 5c is formed in the middle part on the rear side of the barrier blade 5 in a shape shorter than the height of the barrier blade 5. A protruding part 3a protruding from the middle part on the front side of the barrier blade 3 is slidably inserted into the vertical groove 5c in such way as to be movable relative to the barrier blade 5. With the groove 5c thus engaging the protruding part 3a, the barrier blades 3 and 5 are vertically slidable relative to each other as much as the length of the groove 5c.

A groove 6c which does not extend to the upper and lower sides of the barrier blade 6 is formed in the middle part on the rear side of the barrier blade 6 in a manner similar to the groove 5c. A protruding part 4a which protrudes from the middle part on the front side of the barrier blade 4 is slidably inserted into the groove 6c. Therefore, the barrier blade 4 is vertically movable relative to the barrier blade 6 as much as the length of the groove 6c of the barrier blade 6.

A pair of pins 3b and 3c protrude from the rear side of the barrier blade 3 in parallel to the optical axis. The pin 3b is slidably inserted into a slot 8b provided in the fore end part of the lever 8. The pin 3b protrudes rearwardly of the barrier base plate 11 extending through a vertical groove 11p formed in the barrier base plate 11 and is inserted into a hole 12b formed in one end of a lever 12 which will be described later on. The other pin 3c is slidably inserted into a slot 7b provided in the fore end part of the lever 7 and is also slidably inserted into a vertical groove 11n provided in the barrier base plate 11.

A pair of pins 4b and 4c protrude from the rear side of the barrier blade 4 in parallel to the optical axis. The pin 4b is slidably inserted into a slot 9b provided in the fore end part of the lever 9 and is also slidably inserted into a vertical groove 11k provided in the barrier base plate 11. The other pin 4c is slidably inserted into a slot 10b provided in the fore end part of the lever 10 and is also slidably inserted into a vertical groove 11m provided in the barrier base plate 11. The pin 4c is further inserted into a hole 13b formed in one end of a lever 13 which is disposed on the rear side of the barrier base plate 11.

On the front side of the barrier base plate 11, various parts are arranged in the following manner. A pin 11e is inserted in a hole 10a formed in the lever 10. A pin 11f is inserted in a hole 9a formed in the lever 9. A pin 11h is inserted in a hole 8a formed in the lever 8. A pin 11g is inserted in a hole 7a formed in the lever 7. Vertical guide parts 11a and 11b are in sliding contact with the outer faces of the protruding parts 6a and 6b disposed at the right and left side ends of the barrier blade 6. A pair of vertical guide parts 11c and 11d are in sliding contact with the outer faces of the protruding parts 5a and 5b disposed at the right and left side ends of the barrier blade 5. A vertical groove 11k is arranged to serve as a guide for the ascending and descending motions of the pin 4b of the barrier blade 4. A vertical groove 11m is arranged to serve as a guide for the ascending and descending motions of the pin 4c of the barrier blade 4. A vertical groove 11n is arranged to serve as a guide for the ascending and descending motions of the pin 3b of the barrier blade 3. A vertical groove 11p is arranged to serve as a guide for the ascending and descending motions of the pin 3c of the barrier blade 3. Further, a peripheral part of the barrier base plate 11 is cut away in the circumferential direction of the base plate 11 to provide an arc-formed air space part for a rotating passage of the arm 2b of the rotary barrier plate 2.

The lever 7 is pivotally attached to the pin 11g of the barrier base plate 11 at its hole 7a. The lever 8 is pivotally attached to the pin 11h of the barrier base plate 11 at its hole 8a. The lever 9 is pivotally attached to the pin 11f of the barrier base plate 11 at its hole 9a. The lever 10 is pivotally attached to the pin 11e of the barrier base plate 11 at its hole 10a. Pins 11i and 11j protrude from the rear side face of the barrier base plate 11. The lever 13 is pivotally attached to the pin 11i at the hole 13a of the lever 13. The lever 12 is pivotally attached to the pin 11j at the hole 12a of the lever 12.

The levers 12 and 13 are disposed rearwardly of the barrier base plate 11. In the lever 12, a hole 12b is formed to have the pin 3b of the barrier blade 3 rotatably inserted therein. In the lever 13, a hole 13b is formed to have the pin 4c of the barrier blade 4 rotatably inserted therein. The levers 12 and 13 are arranged to be driven by a cam ring 14 and have follower pins 12c and 13c which respectively engage cam parts formed along the inner circumferential edge of the cam ring 14. A spring 20 is fitted on the pin 11j which pivotally carries the lever 12. The lever 12 is thus urged by the spring 20 to turn around counterclockwise on the hole 12a (in the direction of pushing the follower pin 12c against the inner circumferential face of the cam ring 14). A spring 22 is fitted on the pin 11i which pivotally carries the lever 13. The lever 13 is thus urged by the spring 22 to turn around counterclockwise on the hole 13a (in the direction of pushing the follower pin 13c against the inner circumferential face of the cam ring 14.

Further, the barrier base plate 11 is provided with a hole (or aperture) 11q, which is formed in the middle part of the barrier base plate 11 in the same shape and size as the aperture 1c of the barrier cover 1 and the aperture 2a of the rotary barrier plate 2. The hole 11q thus defines a barrier aperture obtained when the barrier fully opens.

The cam ring 14 which is rotatably carried by the barrier base plate 11 is disposed rearwardly of the barrier base plate 11. A hole (or aperture) which has the same width as the hole 11q of the base plate 11 is formed in the middle part of the cam ring 14. The upper and lower peripheral parts of the hole of the cam ring 14 are formed in the shape of cams which engage the follower pins 12c and 13c of the levers 12 and 13, with stepped parts 14b and 14c formed along the peripheral edge of the hole of the cam ring 14.

The cam ring 14 is provided with a gear 14d which extends over a predetermined length along the outer peripheral edge of the cam ring 14. The gear 14d is arranged to receive a driving force coming from a gear 15 which is disposed in rear of the cam ring 14. The gear 15 is rotatably carried by a fixing piece 16 which is mounted on the inner circumferential face of the lens barrel member 18 for the purpose of mounting the gear 15. The gear 15 is formed as a double gear consisting of a large diameter gear part 15a and a small diameter gear part 15b. The small diameter gear part 15b meshes with the gear 14d of the cam ring 14.

A driving ring 17 is disposed rearwardly of the gear 15. The large diameter gear part 15a of the gear 15 meshes with a gear part 17a which is formed along the outer peripheral part of the driving ring 17. One end of a spring 21 is attached to the driving ring 17 to urge the driving ring 17 to move counterclockwise, i.e., in the direction of opening the lens barrier. The other end of the spring 21 is secured to a spring peg provided on the inner circumferential face of the lens barrel member 18. The spring 21 is thus arranged to function as a barrier opening spring.

The driving ring 17 is provided with a cam piece 17b which extends rearwardly in parallel to the optical axis and is arranged to be capable of engaging a cam piece 19 (or a barrier driving member) which is secured to a stationary part or the like of the camera body. When the lens barrel member 18 is retracted back to a position where the lens barrel 18 is stowed into the camera body, the rear end of the cam piece 17b begins to engage the fore end face 19a of the cam piece 19. Then, the cam piece 17b receives the reaction of the fore end face 19a in the direction of rotation to cause the driving ring 17 to rotate about the optical axis while overcoming the tension of the spring 21.

Next, the operation of the lens barrier mechanism which is arranged as described above is described with reference to FIGS. 2(a), 2(b) and 2(c) as follows.

Figure 2B:
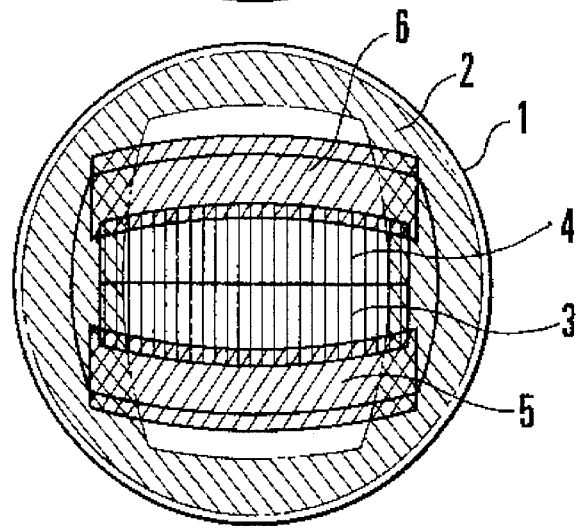
Figure 2C:
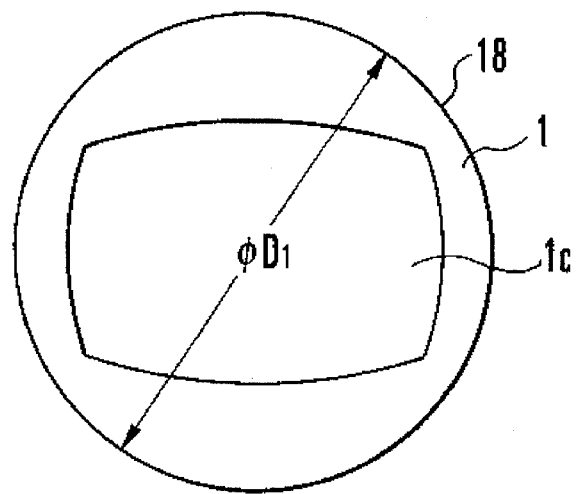

The operation to be performed when the lens barrel member 18 has been drawn out from its retracted position, with the lens barrier in a full open state, is first described. When the camera is in a standby state for shooting, with the lens barrel member 18 having been drawn out from its retracted position, the rear end of the cam piece 17b of the driving ring 17 is away from the fore end of the cam piece 19. The driving ring 17 is then in a position of having been turned around counterclockwise to a maximum extent by the spring 21. The rotary barrier plate 2 then has its aperture (or hole) 2a longer in the horizontal direction as shown in FIGS. 1 and 2(a). The barrier blades 3 and 5 are retracted together to a position below the aperture 2a (between the peripheral edge of the aperture 2a and the outer circumferential edge of the lens barrel member 18). The barrier blade 3 is hidden behind the barrier blade 5. The barrier blades 4 and 6 are retracted together to a position above the aperture 2a, and the barrier blade 4 is hidden behind the barrier blade 6. Under this condition, the protruding part 3a of the barrier blade 3 is located in the lower end position of the groove 5c of the barrier blade 5. The protruding part 4a of the barrier blade 4 is located in the upper end position of the groove 6c of the barrier blade 6. The follower pin 12c of the lever 12 is engaging the cam stepped part 14c of the inner circumferential edge of the cam ring 14, while the follower pin 13c of the lever 13 is engaging the other stepped cam part 14b of the inner circumferential edge of the cam ring 14. Therefore, the hole 12b of the lever 12 is in a state of having been turned around clockwise on the hole 12a which is the center of rotation of the lever 12. The pin 3b of the barrier blade 3 which is inserted in the hole 12b is thus in a state of having been pushed downward. The follower pin 13c of the lever 13 is, on the other hand, in a state of having been pushed down by the stepped part 14b of the cam ring 14. Therefore, the hole 13b of the lever 13 is in a state of having been moved upward, and the pin 4c of the barrier blade 4 is thus in a state of having been pulled upwardly.

With the lens barrel member 18 beginning to retreat from the above-stated shooting standby state (a state of having the lens barrier fully open), when the lens barrel member 18 comes near its retracted position, the rear end of the cam piece 17b which is protruding from the driving ring 17 comes into contact with the fore end face 19a of the cam piece 19. A reaction force applied in the rotating direction from the cam piece 19 to the cam piece 17b then causes the driving ring 17 to receive a torque in the direction opposite to the tension of the spring 21 (a clockwise rotating force as viewed in FIG. 1). The driving ring 17 is thus driven to turn around clockwise. As a result, the gear 15 rotates clockwise on its axis as viewed in FIG. 1. The cam ring 14 which meshes with the small diameter gear part 15b of the gear 15 is then rotated counterclockwise as viewed in FIG. 1. Therefore, the rotary barrier plate 2 which has its arm 2b engaging the cam ring 14 is rotated counterclockwise from its state shown in FIG. 1. This rotation comes to a stop when the rotary barrier plate 2 has turned around as much as 90 degrees. The state of the aperture (hole) 2a of the rotary barrier plate 2 then changes into a state of being longer in the vertical direction as indicated by a two-dot chain line in FIG. 2(b). Therefore, the right and left end parts of the oblong aperture (or hole) 11q of the barrier base plate 11 and those of the oblong aperture (hole) 1c of the barrier cover 1 are shielded and covered by the rotary barrier plate 2.

The shielding action of the barrier blades 3 to 6 begins concurrently with the above-stated action of the rotary barrier plate 2. When the cam ring 14 is rotated counterclockwise from its state shown in FIG. 1, the follower pins 13c and 12c which have been pushed respectively against the stepped parts 14b and 14c of the cam ring 14 move to positions on the outside of the inner circumferential edge of the cam ring 14 (to positions lower than the stepped parts 14b and 14c). As a result, the lever 13 is turned round counterclockwise on its pivotal hole 13a as viewed in FIG. 1. The lever 12 is turned around clockwise on its pivotal hole 12a. The hole 13b of the lever 13 thus moves downward and the hole 12b of the lever 12 moves upward. Therefore, the pin 4c of the barrier blade 4 receives a downward driving force and the barrier blade 4 begins to move downward. The pin 3b of the barrier blade 3 receives an upward driving force and the barrier blade 3 begins to move upward. Since the levers 9 and 10 and the barrier blade 4 jointly constitute a parallel link mechanism, and the levers 7 and 8 and the barrier blade 3 also jointly constitute another parallel link mechanism in this case, the barrier blades 4 and 3 can be vertically moved in in line with to each other.

When the barrier blades 4 and 3 begin to move in the vertical direction, the protruding part 4a of the barrier blade 4 moves downward from the upper end position of the groove 6c of the barrier blade 6. When the protruding part 4a reaches the lower end of the groove 6c, the relative movement of the barrier blade 4 with respect to the barrier blade 6 comes to cease, and the barrier blade 4 begins to move together with the barrier blade 6 further downward. The barrier blade 3, on the other hand, moves upward relative to the barrier blade 5 for a short while after commencement of its upward movement. However, when its protruding part 3a reaches the upper end of the groove 5c of the barrier blade 5, the barrier blade 5 begins to move upward together with the barrier blade 3. When the barrier blade 3 and the barrier blade 4 come to abut on each other, the rotation of the driving ring 17 comes to a stop (as the cam of the cam piece 17b and that of the cam piece 19 are designed to stop the driving ring 17 from rotating at this time). The lens barrier then completely shields or covers the lens, and the lens barrel member 18 reaches its retracted position.

Further, when the lens barrier comes to completely cover the lens, the arm 2b of the rotary barrier plate 2 has come to abut on the outer wall face of the guide part 11a of the barrier base plate 11 by turning around counterclockwise from its position shown in FIG. 1. The follower pin 13c of the lever 13 then abuts on a part of the inner circumferential edge of the cam ring 14 in the neighborhood of its cutout part 14a, while the follower pin 12c of the lever 12 abuts on another part of the inner circumferential edge of the cam ring 14, 180 degrees away from the position of the follower pin 13c. In other words, with the lens barrier in its completely shielding and covering state, the follower pins 12c and 13c of the levers 12 and 13 are abutting on the inner circumferential edge points across the maximum radiuses of the oblong aperture of the cam ring 14.

Next, the operation of the lens barrier mechanism to be performed when the lens barrel member 18 is to be drawn out from the above-stated retracted position to the shooting standby position is described as follows.

During the process of drawing out the lens barrel member 18 forward from its retracted position, the cam piece 17b of the driving ring 17 parts from the fore end cam face 19a of the stationary cam piece 19 at a certain point. Then, the driving ring 17 which has been under restraint of the engagement of the two cam pieces 17b and 19 comes to be driven by the force of the spring 21 to rotate counterclockwise as viewed in FIG. 1. Therefore, the gear 15 rotates also counterclockwise. The cam ring 14 is thus caused to rotate clockwise. The rotary barrier plate 2 is also caused to rotate clockwise from its state shown in FIG. 2(b). In this instance, the arm 2b of the rotary barrier plate 2 comes to a stop by impinging on one end of a cutaway part formed in the outer circumferential edge of the barrier base plate 11. The state of the aperture 2a of the rotary barrier plate 2 then becomes a horizontally oblong state as shown in FIG. 2(a). When the cam ring 14 is rotated clockwise, the follower pins 12c and 13c of the levers 12 and 13 which have been abutting on the cam ring 14 at its maximum radius points change their positions relative to the cam ring 14 in accordance with the rotation of the cam ring 14. When the cam ring 14 is rotated up to its position shown in FIG. 1, the follower pin 13c of the lever 13 abuts on the stepped part 14b of the cam ring 14 and the follower pin 12c of the lever 12 abuts on the stepped part 14c of the cam ring 14.

As a result, the follower pin 13c is pushed down to cause the barrier blade 4 to be pulled up from its covering position. The follower pin 12c of the lever 12 is conversely pushed up to cause the barrier blade 3 to be pushed down from its covering position. Therefore, the barrier blades 3 and 4 which have been abutting on each other begin to move away from each other. The barrier blades 3 and 4 then individually move in this manner until their protruding parts 3a and 4a come to abut respectively on the end parts of the vertical grooves 5c and 6c of the barrier blades 5 and 6. After the protruding parts 3a and 4a abut on the end parts of the grooves 5c and 6c, the barrier blade 3 descends together with the barrier blade 5, while the barrier blade 4 ascends together with the barrier blade 6. The ascent and descent of the two pairs of barrier blades, i.e., the lens barrier opening movements, continue until the rotation of the driving ring 17 comes to an end. These movements eventually bring about the state as shown in FIG. 2(a) to have the lens barrier completely open. The drawing-out movement of the lens barrel member 18 then also comes to an end to bring the camera into the shooting standby state.

As described in the foregoing, the lens barrier mechanism arranged according to this invention includes the rotary barrier plate having a horizontally oblong aperture which is nearly the same as the outside diameter of the lens barrel member, and barrier blades which are arranged to be stowable within a space between the outer circumferential edge of the lens barrel member and the upper and lower borders of the aperture of the rotary barrier plate and to be movable up and down. Such being the arrangement, the lens barrier mechanism can be used also for a camera of the kind having a large wide image plane and having the horizontal length of the aperture of its lens barrier similar to the outside diameter of its lens barrel.

What is claimed is:

1. An optical apparatus having an aperture about an optical axis thereof and a lens barrier mechanism for opening and closing said aperture, said lens barrier mechanism comprising:

a first barrier member which circumscribes and is rotatable about said optical axis; and a second barrier member which is shiftable relative to said optical axis.

2. An apparatus according to claim 1, wherein said first barrier member is capable of covering a first part of the aperture, and said second barrier member is capable of covering a remaining part of the aperture.

3. An apparatus according to claim 1, wherein said optical apparatus has a lens barrel part, said lens barrier mechanism being arranged with said lens barrel part.

4. An apparatus according to claim 3, wherein said lens barrel part is arranged to be movable in the direction of said optical axis, and said lens barrier mechanism is arranged to rotate said first barrier member and to shift said second barrier member in accordance with the movement of said lens barrel part in the direction of said optical axis.

5. An apparatus according to claim 4, wherein movement of said lens barrel part from a protruding state to a state of being stowed within a body of the optical apparatus causes said first and second barrier members to close said aperture.

6. An apparatus according to claim 1, wherein the aperture has a horizontally oblong shape, and said first barrier member is arranged to cover areas of the aperture adjacent to vertically extending margins of the aperture.

7. An apparatus according to claim 1, wherein said second barrier member comprises upper and lower barrier members, which are arranged to cover a part of the aperture by being shifted in respective opposite directions.

8. An apparatus according to claim 6, wherein said second barrier member comprises upper and lower barrier members, which are arranged to cover a part of the aperture by being shifted in respective opposite directions.

9. An optical apparatus having an aperture about and optical axis thereof and a lens barrier mechanism for covering said aperture, said lens barrier mechanism, comprising:

a first barrier member which is rotatable about said optical axis and has an opening formed in the middle part thereof and a part adapted to cover a first area of the aperture;

a second barrier member arranged to cover, by moving over the aperture, an area of the aperture which cannot be covered by the first barrier member; and means for changing the aperture from a covered state over to an open state and from an open state to a covered state by causing said first barrier member to rotate and said second barrier member to move.

10. An apparatus according to claim 9, wherein said optical apparatus has a lens barrel part, said lens barrier mechanism being arranged with said lens barrel part.

11. An apparatus according to claim 10, wherein said lens barrel part is arranged to be movable in the direction of said optical axis, and said lens barrier mechanism is arranged to rotate said first barrier member and to move said second barrier member in accordance with the movement of said lens barrel part in the direction of said optical axis.

12. An apparatus according to claim 11, wherein movement of said lens barrel part from a protruding state to a state of being stowed within a body of the optical apparatus causes said first and second barrier members to cover said aperture.

13. An apparatus according to claim 11, wherein the aperture has a horizontally oblong shape, and said first barrier member is arranged to cover areas of the aperture adjacent to vertically extending margins of the aperture.

14. An apparatus according to claim 9, wherein said second barrier member comprises upper and lower barrier members, which are arranged to cover a part of the aperture by moving in respective opposite directions.

15. An optical apparatus having an elongate aperture about an optical axis thereof and a lens barrier mechanism for opening and closing said aperture, said lens barrier mechanism comprising first and second barrier members successively disposed along said optical axis and concurrently movable for opening and closing said aperture, said first barrier member defining an elongate opening of substantially the same size as said aperture and said second barrier member being supported in said apparatus for movement transversely of said optical axis.

16. An apparatus according to claim 15, wherein said first barrier member has no relatively movable parts therein.

17. An apparatus according to claim 15, wherein said second barrier member comprises first and second parts movable in respective different directions transversely of said optical axis.

18. An apparatus according to claim 16, wherein said second barrier member comprises first and second parts movable in respective different directions transversely of said optical axis.

19. An apparatus according to claim 15, wherein said first barrier member is supported in said apparatus for rotation about said optical axis.

20. An optical apparatus having an aperture about an optical axis thereof and a lens barrier mechanism for opening and closing said aperture, said lens barrier mechanism comprising first and second barrier members successively disposed along said optical axis, said first barrier member being immobile transversely of said optical axis and said second barrier member being supported in said apparatus for movement transversely of said optical axis.

21. An apparatus according to claim 20, wherein said first barrier member is supported in said apparatus for rotation about said optical axis.

* * * * *